(12) United States Patent
Filho et al.

(10) Patent No.: US 8,647,026 B2
(45) Date of Patent: Feb. 11, 2014

(54) CUTTING TOOL WITH POCKET FEATURE FOR REDUCING STRESS

(75) Inventors: Ruy Frota de Souza Filho, Latrobe, PA (US); Mark Alan Francis, Solon, OH (US)

(73) Assignee: Kennametal Inc., Latrobe, PA (US)

( * ) Notice: Subject to any disclaimer, the term of this patent is extended or adjusted under 35 U.S.C. 154(b) by 69 days.

(21) Appl. No.: 13/304,044

(22) Filed: Nov. 23, 2011

(65) Prior Publication Data

US 2013/0129431 A1    May 23, 2013

(51) Int. Cl.
  *B23B 27/16*   (2006.01)
  *B23B 27/00*   (2006.01)

(52) U.S. Cl.
  USPC .................................. 407/67; 407/33; 407/34

(58) Field of Classification Search
  USPC ............ 407/66, 67, 103, 35, 113, 114, 34, 33
  See application file for complete search history.

(56) References Cited

U.S. PATENT DOCUMENTS

| | | | |
|---|---|---|---|
| 5,658,100 A | 8/1997 | Deiss et al. | |
| 6,017,171 A | 1/2000 | Karlsson | |
| 7,121,769 B2 | 10/2006 | Satran et al. | |
| 7,204,662 B1 | 4/2007 | Long, II et al. | |
| 7,241,082 B2 * | 7/2007 | Smilovici et al. | 407/113 |
| 7,255,518 B2 | 8/2007 | Wallstrom et al. | |
| 7,270,504 B2 | 9/2007 | Tubinger et al. | |
| 7,429,150 B2 * | 9/2008 | Kovac | 407/66 |
| 7,604,441 B2 * | 10/2009 | Bhagath | 407/113 |
| 7,922,427 B2 * | 4/2011 | Spitzenberger et al. | 407/104 |
| 8,177,460 B2 * | 5/2012 | Satran et al. | 407/113 |
| 2006/0260439 A1 | 11/2006 | Tubinger et al. | |
| 2007/0280790 A1 | 12/2007 | Kovac | |
| 2010/0329804 A1 | 12/2010 | Okumura | |

FOREIGN PATENT DOCUMENTS

| | | |
|---|---|---|
| DE | 69719361 T2 | 1/2004 |
| JP | 2010234457 A | 10/2010 |
| WO | 9826893 A1 | 6/1998 |
| WO | 2008120186 A1 | 10/2008 |
| WO | 2010080385 A2 | 7/2010 |
| WO | 2010/092807 A1 | 8/2010 |

\* cited by examiner

*Primary Examiner* — Will Fridie, Jr.
(74) *Attorney, Agent, or Firm* — Larry R. Meenan, Esq.

(57) ABSTRACT

A cutting tool includes a tool body having a plurality of pockets for receiving cutting inserts. Each pocket includes a bottom support surface, an axial support surface, a radial support surface and a corner relief between the bottom support surface and the axial support surface. A pocket feature is at least partially located proximate the pocket, and more specifically, at least partially located on a wall between the axial support surface and the radial support surface for reducing a tensile stress of the cutting tool during a machining operation.

12 Claims, 10 Drawing Sheets

CUTTING TOOL WITH POCKET FEATURE FOR REDUCING STRESS

BACKGROUND OF THE INVENTION

Cutting tools, such as milling cutters, are rotatable tools of cylindrical, conical, shaped or disk form, having a plurality of cutting edges. Such cutters are available in many forms, such as plain cylindrical, side milling cutters, face and end mills, formed cutters, and standard and special shaped profile cutters.

End mills employing cutting inserts mounted at the front end of the tool are known in the art. The end mills can be used in several types of applications depending on the configuration of the cutting inserts mounted therein. The cutting inserts may present a peripheral cutting edge for side milling, a front cutting edge for face milling and a curved cutting edge of a so-called "ball-nose" end mill for various copying applications. Four flute mills are probably the most common, but 2, 3 or 6 flutes are also used extensively. End mills are in much used because they can execute a wide variety of milling operations, and the initial cost of the cutter is moderate. Shapes other than cylindrical are also in common use. The shank can be parallel or tapered, and need not necessarily be equal to the cutter teeth diameter.

Usually when an end mill is in operation, the machining force is exerted against one edge of the cutter. The resulting moment is resisted by the tool holder which rigidly grips the cutter shank. Ignoring the fact that the direction of the moment changes continually as the cutter revolves, the cutter can be considered to be stressed as a cantilever.

As shown in FIGS. 8-10, a conventional cutting tool 100, such as an end mill, includes a plurality of insert-receiving pockets 102 disposed between a plurality of flutes 104. Each pocket 102 includes a bottom support surface 106, a radial support surface 108 and an axial support surface 110 for supporting a cutting insert (not shown) when mounted in the pocket 102. Each pocket may also include a corner relief 112 at the intersection between the bottom support surface 106 and the axial support surface 110, and a threaded bore 114 for receiving a threaded fastener (not shown) for securing the cutting insert in the pocket 102. Simulations have shown that a tensile stress of the pocket 102 during machining operations of approximately 742 MPa is located proximate the axial support surface 110 and the corner relief 112, resulting in a safety factor of about 0.66.

While the matter of stress discussed above is related to avoiding fatigue that would result in tool breakage, no less important is the requirement to minimize tool deflection, in order to improve accuracy and surface finish and to reduce vibration and noise. The bending moment, along with the rotation of the cutter, produces a fully reversed stress condition (alternating tensile and compressive stresses), which is the most devastating condition for fatigue.

Accordingly, there is a need for an improved cutting tool that can overcome the limitations of the known cutting tool, and reduce or eliminate the overall stress of the cutting tool.

SUMMARY OF THE INVENTION

The inventors of the invention has solved the problem of high stress associated with conventional cutting tools by providing a pocket feature located proximate the area of high stress on the radial support surface that greatly reduces the tensile stress, thereby improving tool safety and lifetime of the tool.

In one aspect, a cutting tool comprises a tool body including a plurality of pockets for receiving cutting inserts, each pocket comprising a bottom support surface, a radial support surface, an axial support surface and a corner relief between the bottom support surface and the radial support surface, and a pocket feature at least partially located proximate the pocket, wherein the pocket feature reduces a tensile stress of the cutting tool during a machining operation

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
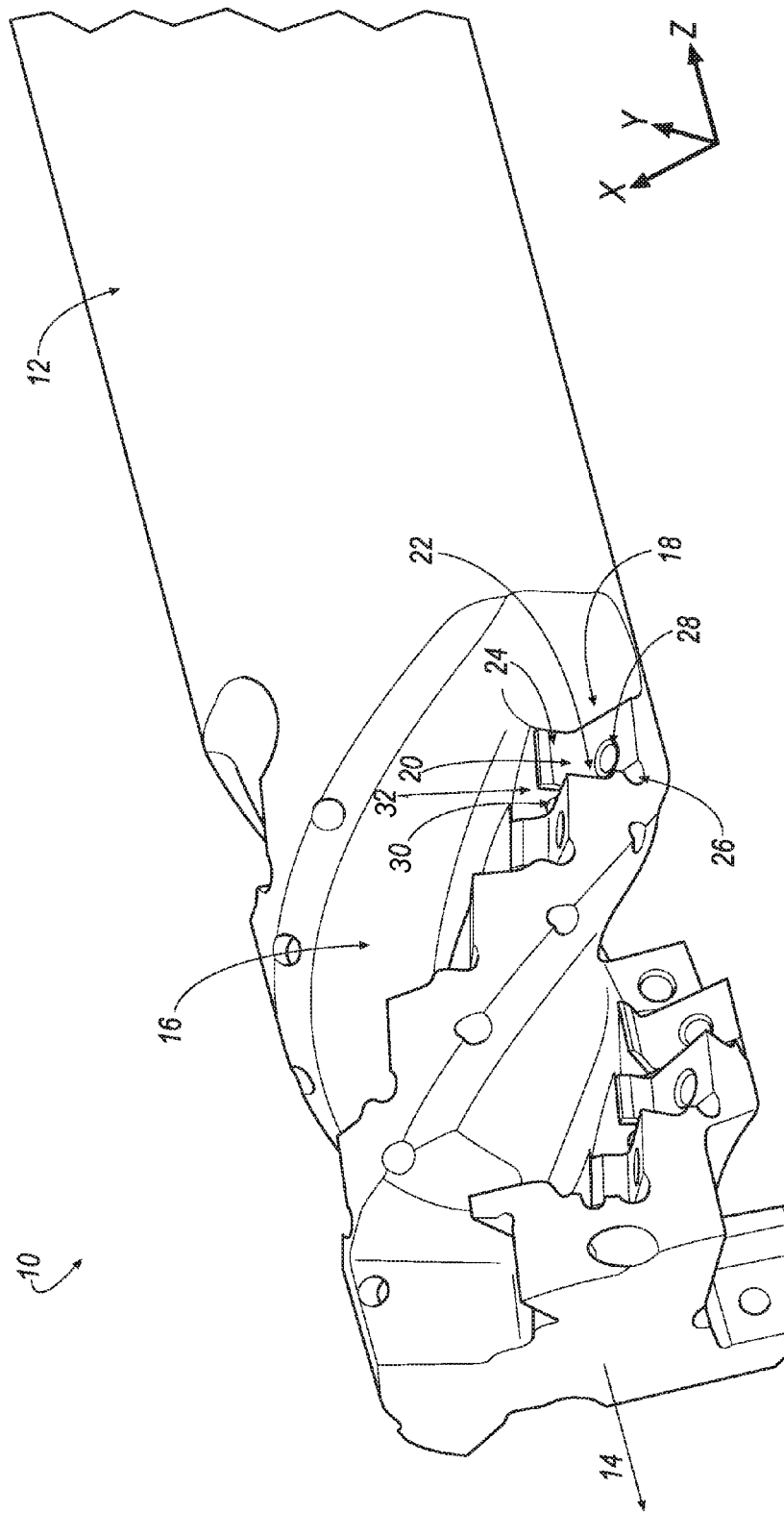
FIG. 1 is an isometric view of a cutting tool according to an embodiment of the invention.

Referring to the drawings, wherein like reference characters represent like elements, there is shown in FIG. 1 a cutting tool 10 includes a generally cylindrical tool body 12 that is generally radially symmetrical about its rotational axis 14. The tool body 12 preferably, but not necessarily, includes a plurality of flutes 16 each bearing a plurality of pockets 18 therein. The pockets 18 are rotationally symmetrically arranged with respect to the axis 14. At least one, but possibly more, of the cutting inserts 12 are configured and dimensioned to be received within and secured to each pocket 18.

In the illustrated embodiment of FIG. 1, a cutting insert (not shown) can be received within and secured to a corresponding pocket 18. It will be appreciated that the invention is not limited by the number of pockets 18, and that the invention can be practiced with any desired number of pockets 18, depending on the dimensions of the tool body 12.

Each pocket 18 has a bottom support surface 20 that may be at an angle with respect to the axis 14. The pocket 18 also includes an axial support surface 22 and a radial support surface 24 that constitute axial and radial abutment surfaces, respectively, for the side walls of the insert when mounted in the pocket 18. A corner relief 26 is provided between the bottom support surface 20 and the axial support surface 22. In the illustrated embodiment, the corner relief 26 has a radius of approximately 0.047 inches (approximately 1.19 mm). However, the radius of the corner relief 26 depends on the design of the cutting insert, and other factors.

A threaded bore 28 extends through the center of the bottom support surface 20 and is substantially perpendicular thereto. In the assembled position of the cutting tool 10, each of the cutting inserts is retained within an pocket 18 by a clamping screw (not shown) that passes through a through bore of the cutting insert and threadingly engages the threaded bore 28 in the pocket 18.

Figure 2:
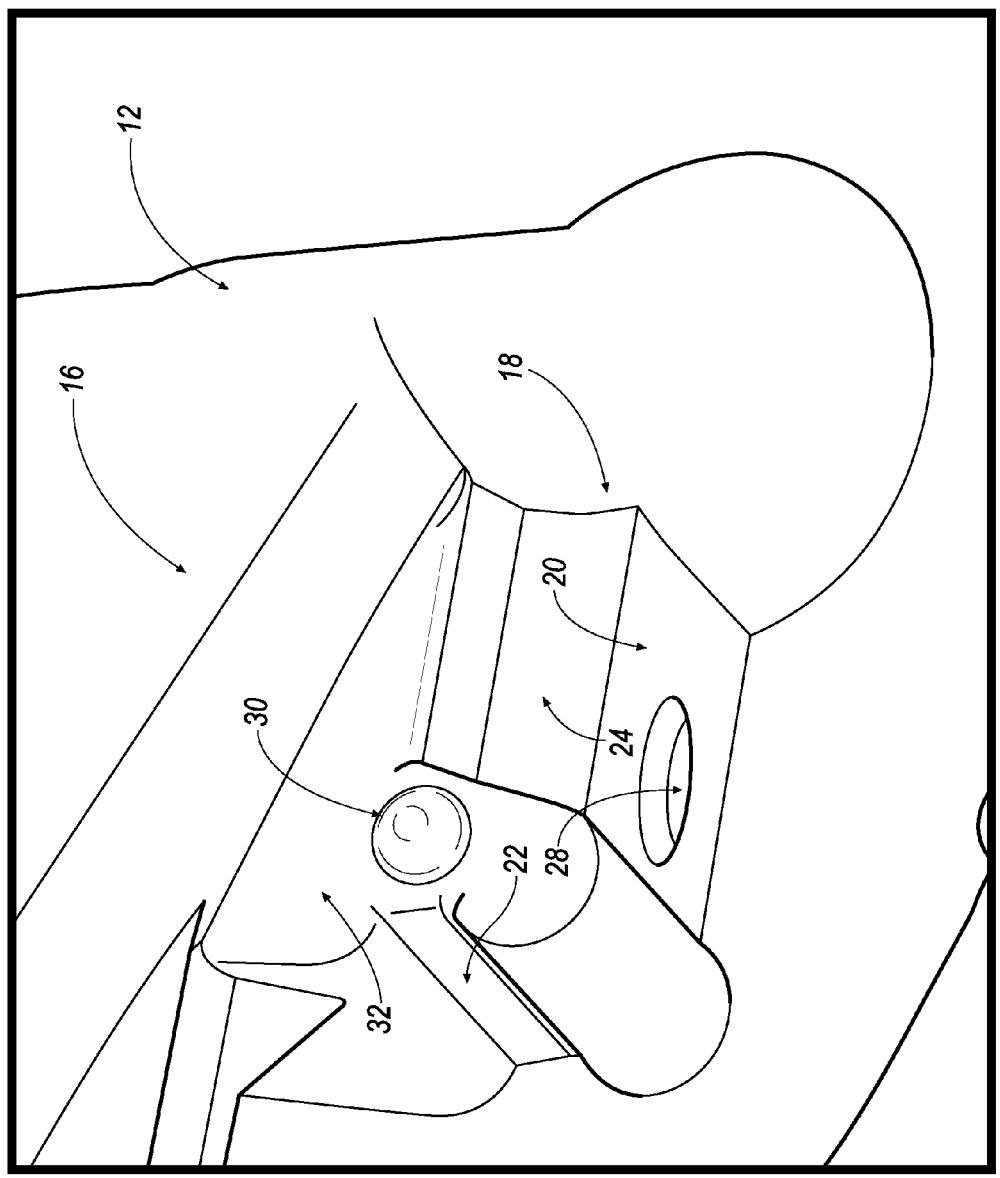
FIG. 2 is an enlarged view of the pocket of the cutting tool of FIG. 1 showing a pocket feature for reducing stress according to an embodiment of the invention.
Figure 10:
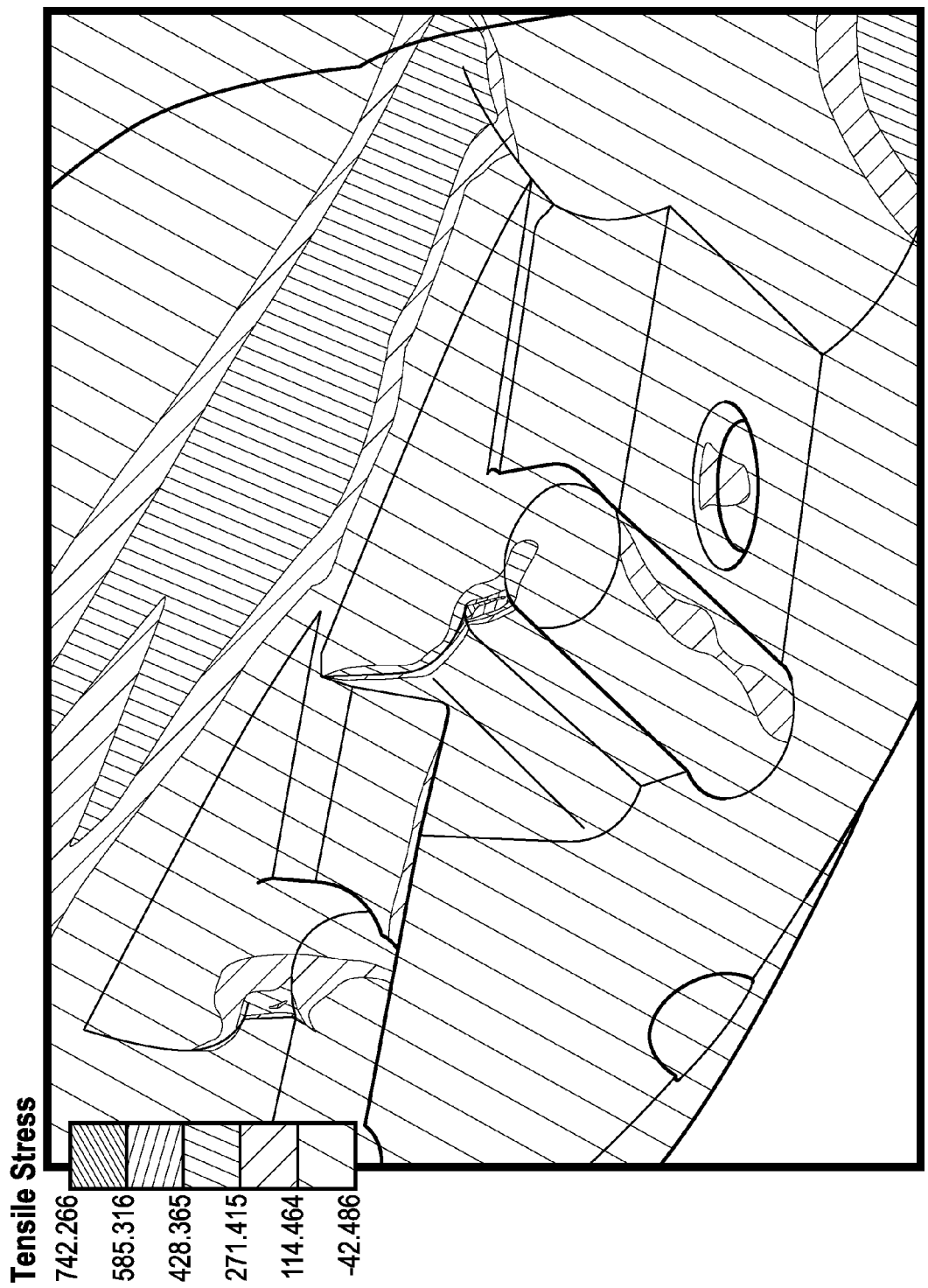
FIG. 10 shows a measurement of the distribution of stress for the pocket of the cutting tool of FIG. 8.

Referring now to FIG. 2, one aspect of the invention is that a pocket feature 30 is located proximate the pocket 18 of the cutting tool 10. Specifically, the pocket feature 30 is located on a wall 32 adjacent the radial support surface 24 of the pocket 18. More specifically, the pocket feature 30 is proximate the area of the highest tensile stress in the conventional pocket having a similar design shown in FIG. 10. In the illustrated embodiment of FIG. 2, the pocket feature 30 is in the form of a round dimple or recess having a depth that is approximately one-half of its diameter.

Figure 3:
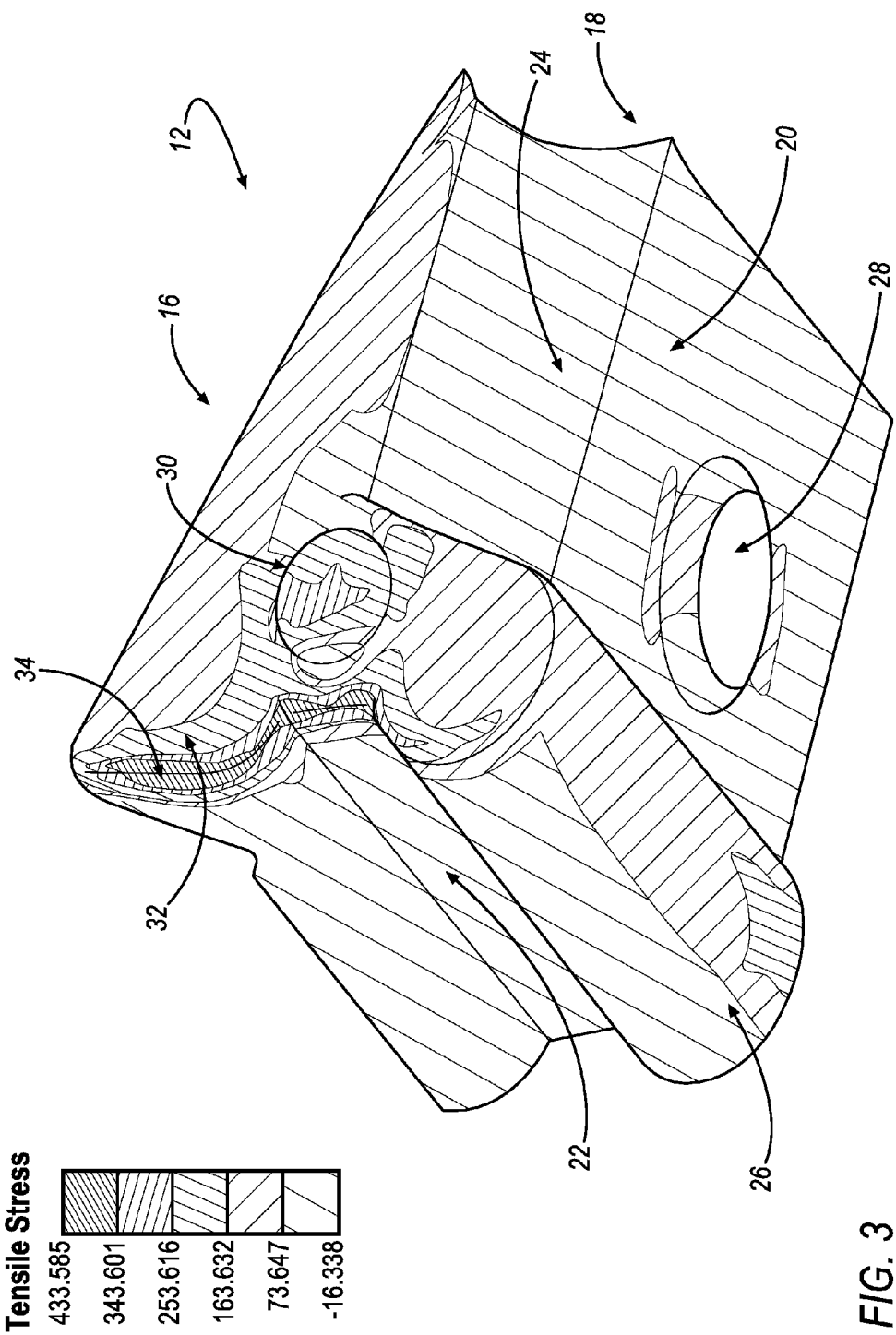
FIG. 3 shows a measurement of the distribution of stress for the pocket of the cutting tool with the pocket feature of FIG. 2.

Referring now to FIG. 3, it has been discovered that the pocket feature 30 in the form of a round dimple located on the wall 32 proximate the area of the highest tensile stress in the conventional pocket having a similar design produces the unexpected result of significantly reducing the tensile stress of the pocket. Specifically, simulations of the tensile stress of the pocket 18 of the cutting tool 10 gives approximately 434 MPa, as compared to the tensile stress of approximately 742 MPa in the conventional pocket 102 of the cutting tool 100.

As shown in FIG. 3, the tensile stress has been more widely dispersed in an area between the axial support surface 22 and the wall 32. In addition, the tensile stress of the pocket 18 is located at a point 34 that is distal from the corner relief 26, as compared to the location of the tensile stress that is proximate the corner relief 112 in the conventional pocket 102. As a result of the pocket feature 30 of the invention, the tensile stress of the pocket is greatly reduced, resulting in a much larger safety factor for fatigue of about 1.43 for the cutting tool 10, as compared to the conventional cutting tool 100.

It will be appreciated that the shape of the pocket feature 30 is not limited to the form of a round dimple shown in FIG. 2, and that the invention can be practiced with any desirable shape having one or more curved surfaces, so long as the recessed shape is located proximate an area of highest tensile stress of the pocket.

Figure 4:
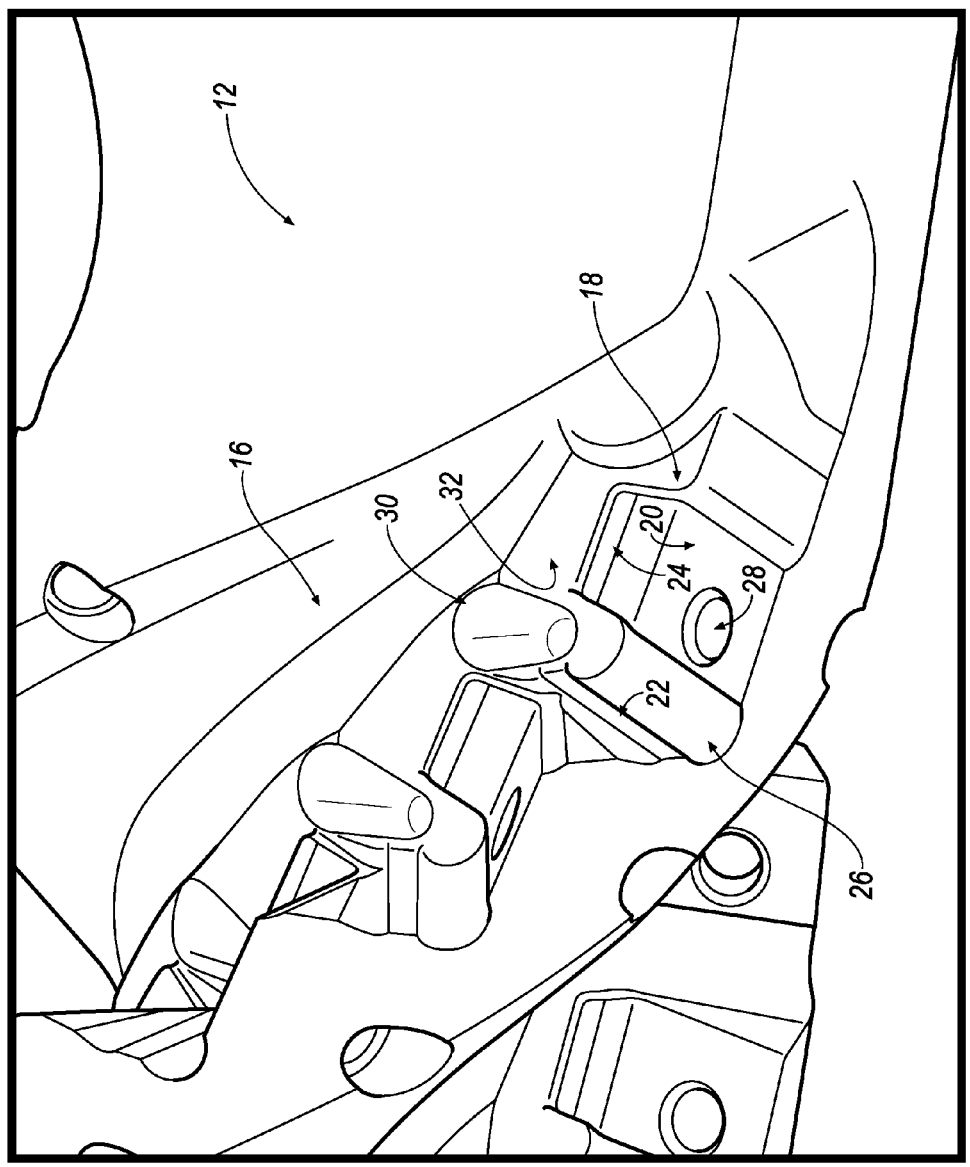
FIG. 4 is an enlarged view of the pocket of the cutting tool of FIG. 1 showing a pocket feature for reducing stress according to an another embodiment of the invention.

Referring now to FIG. 4, the pocket feature 30 is in the form of a recess having a teardrop shape according to an alternate embodiment of the invention. The pocket feature 30 has a depth that is approximately one-half of the width of the teardrop. In other words, the ratio of the maximum width to the maximum depth is about 2:1. Similar to the pocket feature 30 shown in FIG. 2, the pocket feature 30 shown in FIG. 4 is provided on the wall 32 adjacent the radial support surface 24 of the pocket 18. Specifically, the pocket feature 30 is proximate the area of the highest tensile stress in the conventional pocket having a similar design shown in FIG. 10.

Figure 5:
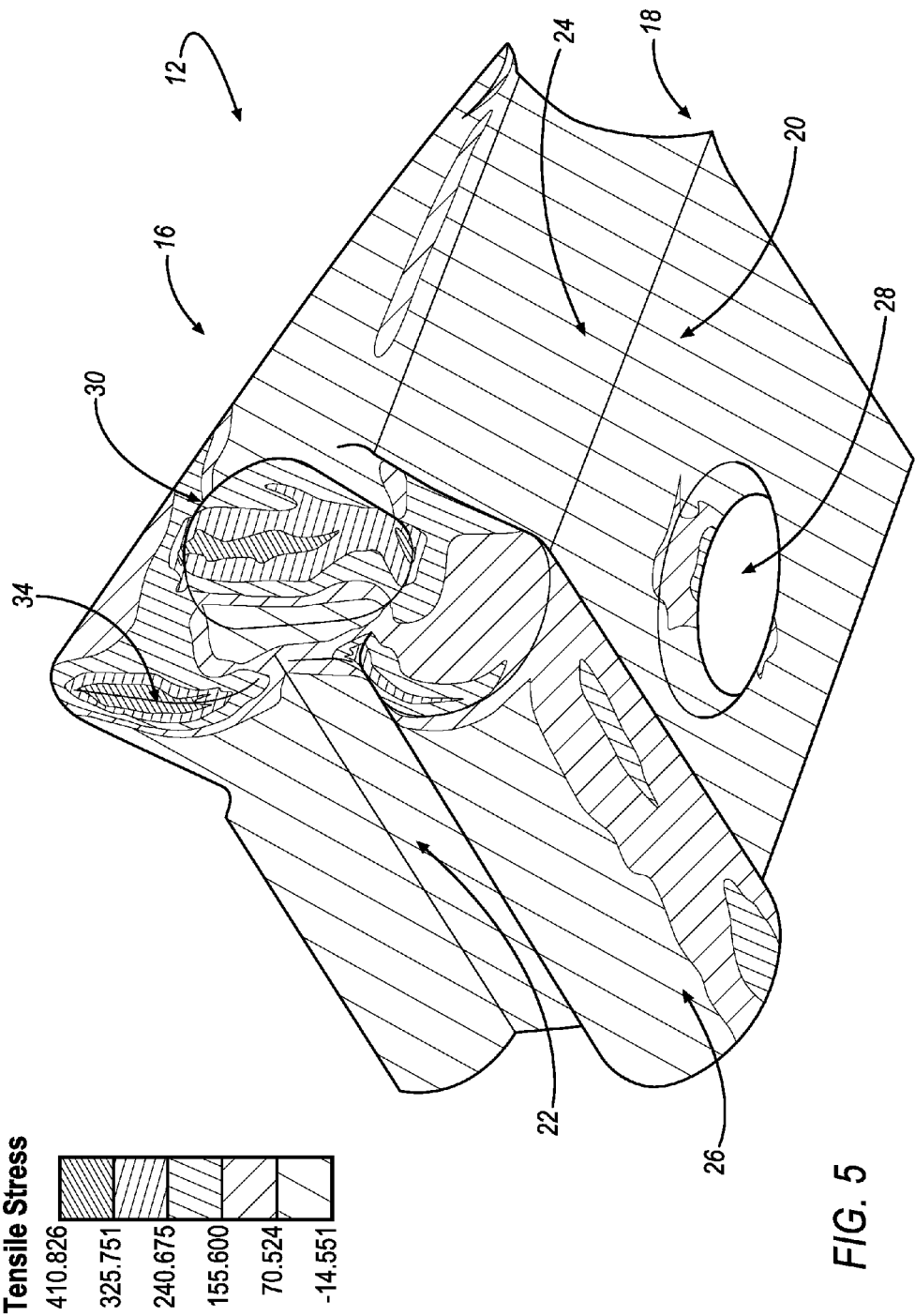
FIG. 5 shows a measurement of the distribution of stress for the pocket of the cutting tool with the pocket feature of FIG. 4.

Referring now to FIG. 5, simulations of the tensile stress of the pocket 18 of the cutting tool 10 is approximately 411 MPa, as compared to the tensile stress of approximately 742 MPa in the conventional pocket 102 of the cutting tool 100.

As shown in FIG. 5, the tensile stress has been more widely dispersed in an area between the axial support surface 22 and the wall 32, and also is partially located within the pocket feature 30 itself. In addition, the tensile stress of the pocket 18 is located at a point 34 that is distal from the corner relief 26, as compared to the location of the tensile stress that is proximate the corner relief 112 in the conventional pocket 102. As a result of the pocket feature 30 of the invention, the tensile stress of the pocket is greatly reduced, resulting in a much larger safety factor for the cutting tool 10, as compared to the conventional cutting tool 100.

In the previous embodiments shown in FIGS. 2-5, the pocket feature 30 is located solely on the wall 32 between the axial support surface 22 and the radial support surface 24. However, it will be appreciated that the invention is not limited to the pocket feature 30 being located solely on the wall 32, and that the invention can be practiced with the pocket feature 30 located generally between the axial support surface 22 and the radial support surface 24.

Figure 6:
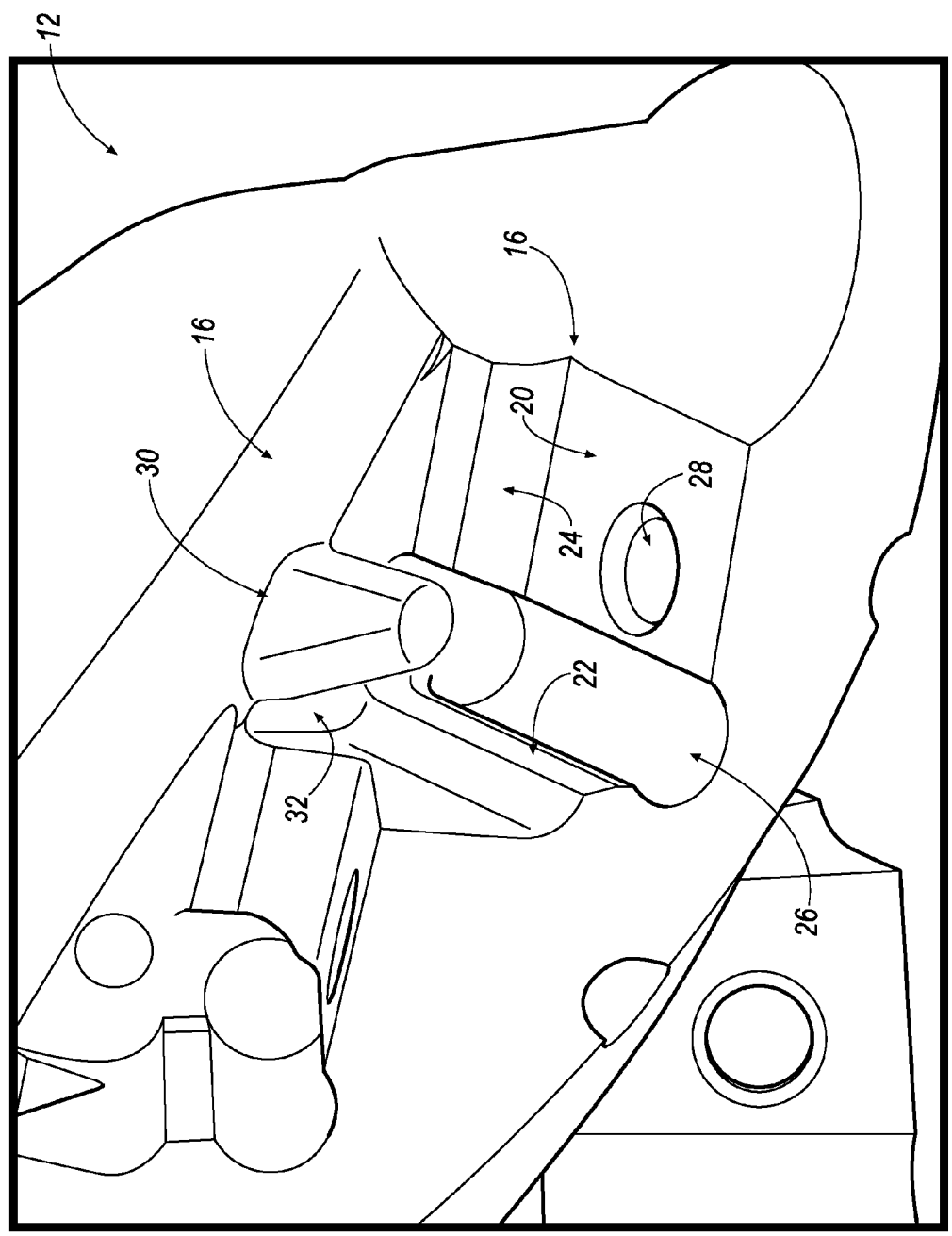
FIG. 6 is an enlarged view of the pocket of the cutting tool of FIG. 1 showing a pocket feature for reducing stress according to an another embodiment of the invention.

Referring now to FIG. 6, the pocket feature 30 is in the form of a recess having a teardrop shape according to an alternate embodiment of the invention. Similar to the pocket feature 30 shown in FIG. 4, the pocket feature 30 has a depth that is approximately one-half of the width of the teardrop. However, unlike the pocket feature 30 shown in FIG. 4, the pocket feature 30 shown in FIG. 4 is provided not only the wall 32 adjacent the radial support surface 24 of the pocket 18, but also extend into the flute 16.

Figure 7:
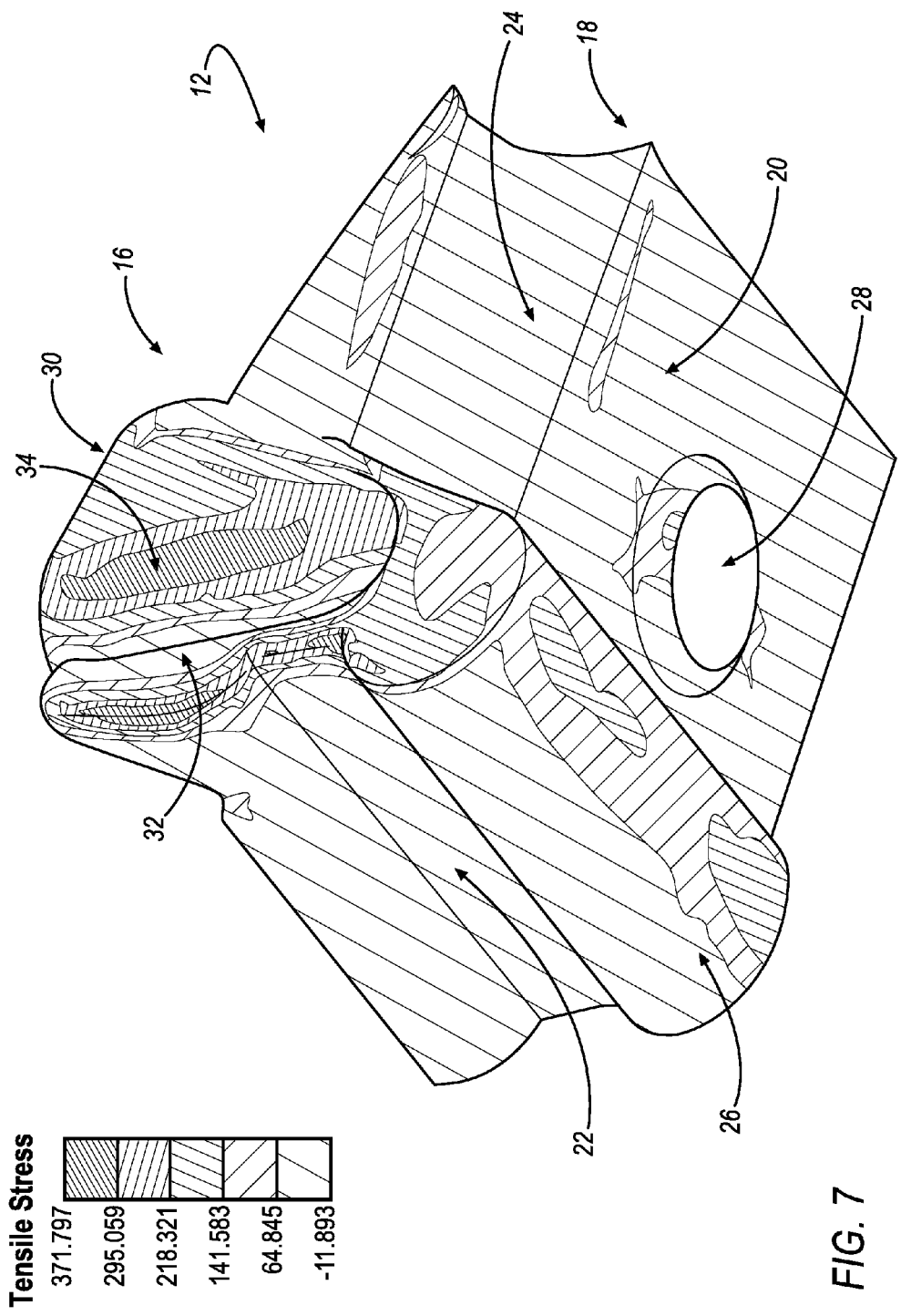
FIG. 7 shows a measurement of the distribution of stress for the pocket of the cutting tool with the pocket feature of FIG. 6.
Figure 8:
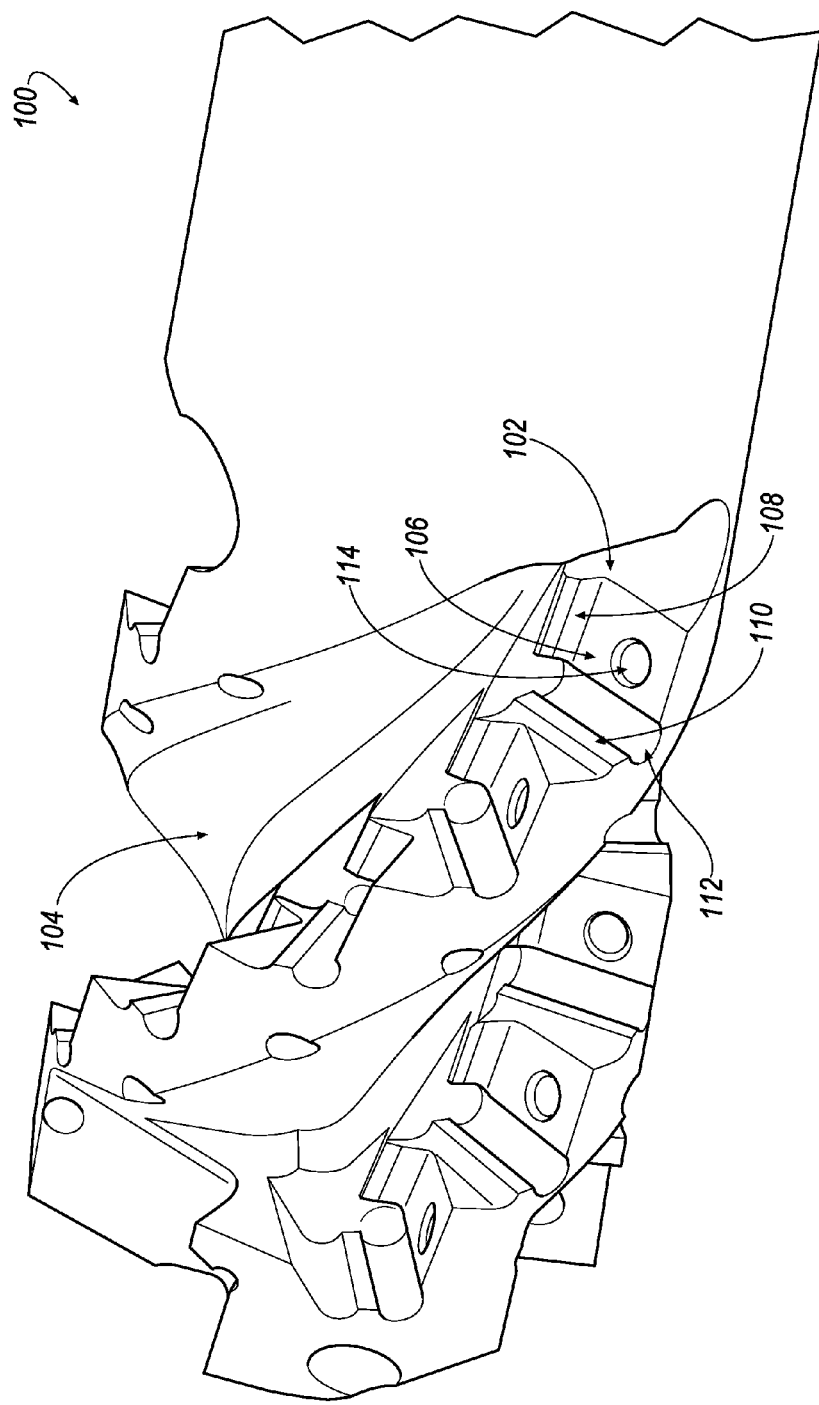
FIG. 8 is an isometric view of a conventional cutting tool.
Figure 9:
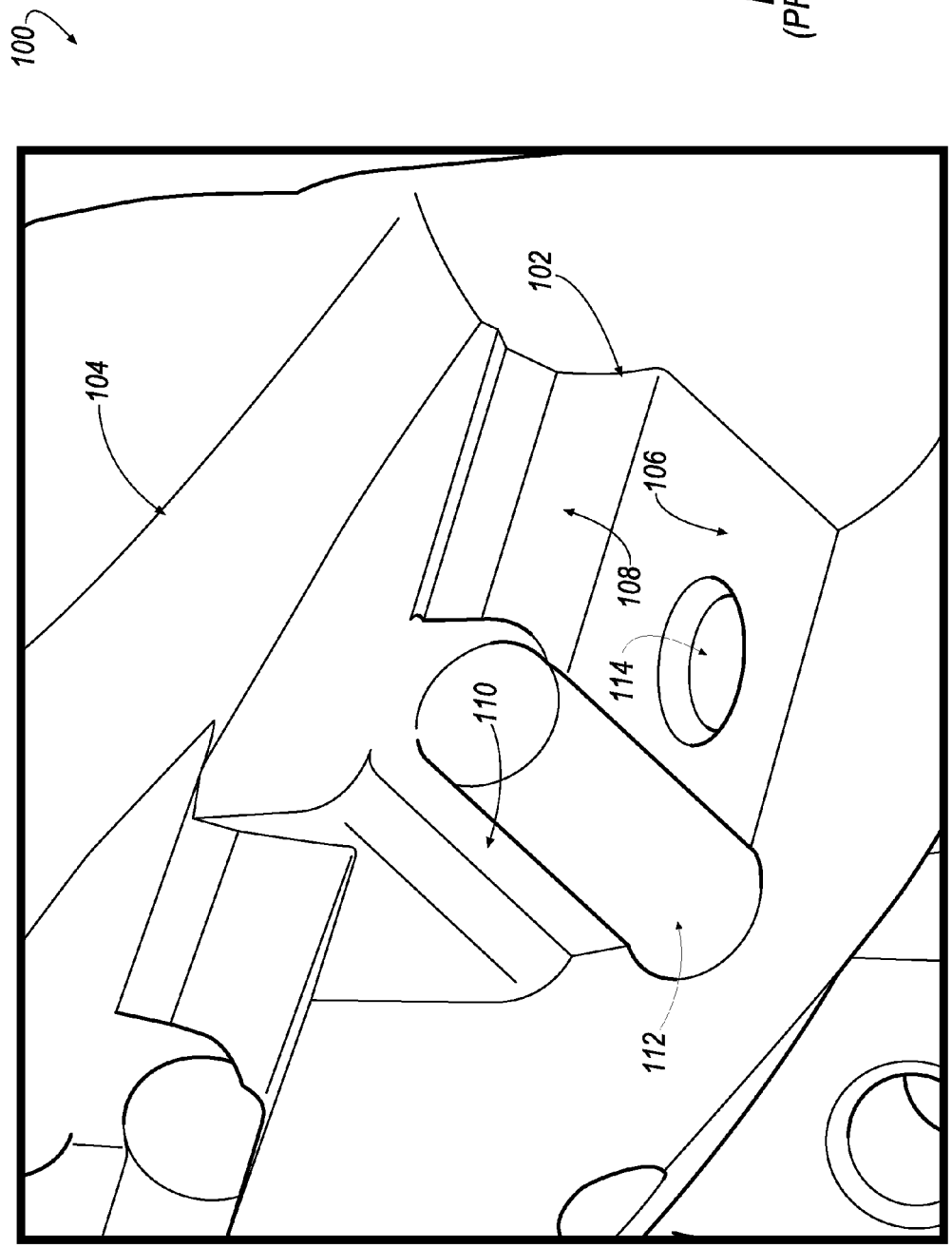
FIG. 9 is an enlarged view of the pocket of the cutting tool of FIG. 8.

Referring now to FIG. 7, simulations of the tensile stress of the pocket 18 of the cutting tool 10 is approximately 372 MPa, as compared to the tensile stress of approximately 742 MPa in the conventional pocket 102 of the cutting tool 100. As a result, a safety factor for fatigue of about 1.60 is achieved in the pocket design of the invention, as compared to a safety factor of about 0.66 in the conventional pocket design.

As shown in FIG. 7, the tensile stress has been more widely dispersed in an area between the axial support surface 22 and the wall 32, and also is partially located within the pocket feature 30 itself. In addition, the tensile stress of the pocket 18 is located at a point 34 that is distal from the corner relief 26, as compared to the location of the tensile stress that is proximate the corner relief 112 in the conventional pocket 102. In fact, the location 34 of the tensile stress is located within the pocket feature 30. As a result of the pocket feature 30 of the invention, the tensile stress of the pocket is greatly reduced, resulting in a much larger safety factor for the cutting tool 10, as compared to the conventional cutting tool 100.

As shown by the above measurements, the pocket feature 30 produces the unexpected result of greatly reducing the tensile stress of the cutting tool, thereby greatly increasing the safety factor. By providing the pocket feature 30 at the location of maximum stress, the tensile stress was reduced by almost 50% as compared to the tensile stress in the conventional cutting tool.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A cutting tool comprising:
   a tool body including a plurality of pockets for receiving cutting inserts, each pocket comprising a bottom support surface, an axial support surface, a radial support surface and a corner relief between the bottom support surface and the axial support surface; and
   a pocket feature at least partially located on a wall adjacent the radial support surface of the pocket, wherein the pocket feature reduces a tensile stress of the cutting tool during a machining operation.

2. The cutting tool of claim 1, wherein the pocket feature is in the form of a round dimple having a depth that is approximately one-half a width of the round dimple.

3. The cutting tool of claim 1, wherein the pocket feature is in the form of a recess having a depth that is approximately one-half a width of the recess.

4. The cutting tool of claim 3, wherein the recess is teardrop shaped.

5. The cutting tool of claim 3, wherein the recess extends into a flute of the tool body.

6. The cutting tool of claim 1, wherein the pocket feature has one or more curved surfaces.

7. A cutting tool comprising:
   a tool body including a plurality of flutes, each flute having a plurality of pockets for receiving cutting inserts, each pocket comprising a bottom support surface, an axial support surface, a radial support surface and a corner relief between the bottom support surface and the axial support surface; and
   a pocket feature at least partially located on a wall adjacent the radial support surface of the pocket, wherein the pocket feature reduces a tensile stress of the cutting tool during a machining operation.

8. The cutting tool of claim 7, wherein the pocket feature is in the form of a round dimple having a depth that is approximately one-half a width of the round dimple.

9. The cutting tool of claim 7, wherein the pocket feature is in the form of a recess having a depth that is approximately one-half a width of the recess.

10. The cutting tool of claim 9, wherein the recess is teardrop shaped.

11. The cutting tool of claim 9, wherein the recess extends into one of the plurality of flutes of the tool body.

12. The cutting tool of claim 7, wherein the pocket feature has one or more curved surfaces.

\* \* \* \* \*